US005566149A

United States Patent [19]
Song

[11] Patent Number: 5,566,149
[45] Date of Patent: Oct. 15, 1996

[54] OPTICAL PICKUP ACTUATOR IN AN OPTICAL DISC PLAYER

[75] Inventor: Ki S. Song, Seoul, Rep. of Korea

[73] Assignee: Daewoo Electronics Co., Ltd., Seoul, Rep. of Korea

[21] Appl. No.: 429,177

[22] Filed: Apr. 26, 1995

[30] Foreign Application Priority Data

Apr. 29, 1994 [KR] Rep. of Korea ................ 94-9288

[51] Int. Cl.⁶ .......................... G11B 7/00; G02B 7/02
[52] U.S. Cl. .................... 369/44.15; 369/44.16; 369/44.22; 359/811; 359/814
[58] Field of Search ............... 369/44.14, 44.15, 369/44.16, 44.22; 359/811, 814, 819

[56] References Cited

U.S. PATENT DOCUMENTS

| | | | |
|---|---|---|---|
| 5,050,964 | 9/1991 | Mori | 369/44.16 |
| 5,144,607 | 9/1992 | Ishida et al. | 369/44.15 |
| 5,177,640 | 1/1993 | Grassens | 359/814 |
| 5,264,968 | 11/1993 | Masunaga | 369/44.16 |
| 5,418,772 | 5/1995 | Tanaka | 369/44.14 |

*Primary Examiner*—Georgia Y. Epps
*Assistant Examiner*—Kim-Kwok Chu
*Attorney, Agent, or Firm*—Fish & Richardson, P.C.

[57] ABSTRACT

An optical pickup actuator having a small overall size with a reduced number of steps of assembly process is disclosed. The optical pickup actuator includes a pair of yokes and a pair of damping gel plates respectively integrally formed with a base plate. Each yoke has a first vertical portion, a horizontal portion and a second vertical portion bent downwards in accordance with a size of a magnet, and is disposed facing each other at each side end of the base plate. Each damping gel plate has a horizontal portion and a vertical portion, and is projected laterally at one side end of the base plate while centering one of the yokes. Accordingly, since the overall size and the steps of assembly process can be respectively reduced, a thin structure of an optical pickup device can be attained, workability and productivity are improved, and performances of magnetic circuits are enhanced.

5 Claims, 5 Drawing Sheets

OPTICAL PICKUP ACTUATOR IN AN OPTICAL DISC PLAYER

BACKGROUND OF THE INVENTION

1. Field of the Invention

The present invention relates to an optical pickup actuator in an optical disc player. More particularly, the present invention relates to an optical pickup actuator for driving an objective lens included in an optical pickup device adapted for recording and/or reproducing the data signals on or from an optical recording medium such as an optical disc.

2. Description of the Prior Art

There are apparatuses which record the data signals or read the recorded data signals on or from the signal recording medium using an optical pickup device. The compact disc (CD) player is one of these types of apparatus. The CD player reproduces the digital signals formed on the signal recording surfaces of the compact discs which have projections called pits. The CD player includes an optical pickup device which is installed just below an optical recording medium such as an optical disc.

Normally an optical pickup device includes an objective lens holder having an objective lens retained therein. Tracking coils and a focusing coil are disposed on the outer periphery of the lens holder. Control signals are supplied to the tracking coils and the focusing coil in order to perform tracking control and focusing control operations. Thus, the optical pickup device is required to support the objective lens holder so that the objective lens may freely move in the tracking direction or the focusing direction in accordance with the input control signals.

The optical pickup device requires a focusing control signal to control the optical beam in the optical axis direction, the so-called focusing direction, so that the optical beam may be correctly converged on the signal recording surface of the optical disc. The laser beam is produced from the optical pickup device. Also, it is necessary to perform a tracking control operation for controlling the laser beam in the radial direction of the optical disc, the so-called tracking direction, to cause the laser beam to follow the signal track on the optical disc. This type of operation is called linear tracking method.

When the optical pickup device has sought a desired track by the track tracking operation, the optical pickup device performs a track following operation.

In the track following operation, the object lens of the optical pickup device focuses the laser beam on the track of the optical disc which is being followed. When the laser beam is not accurately focused on the track of the optical disk being followed or when a focus of the laser beam is slightly deviated from the track, the optical pickup actuator installed in the optical pickup device performs the focusing operation or the tracking operation.

With these focusing and tracking operations of the actuator, the objective lens accurately follows the track while focusing the laser beam on a desired track. Accordingly, the optical pickup actuator in the optical disc player records the data signals on the optical disc or reproduces the digital signals from the optical disc with the aforementioned linear tracking method.

Figure 1:
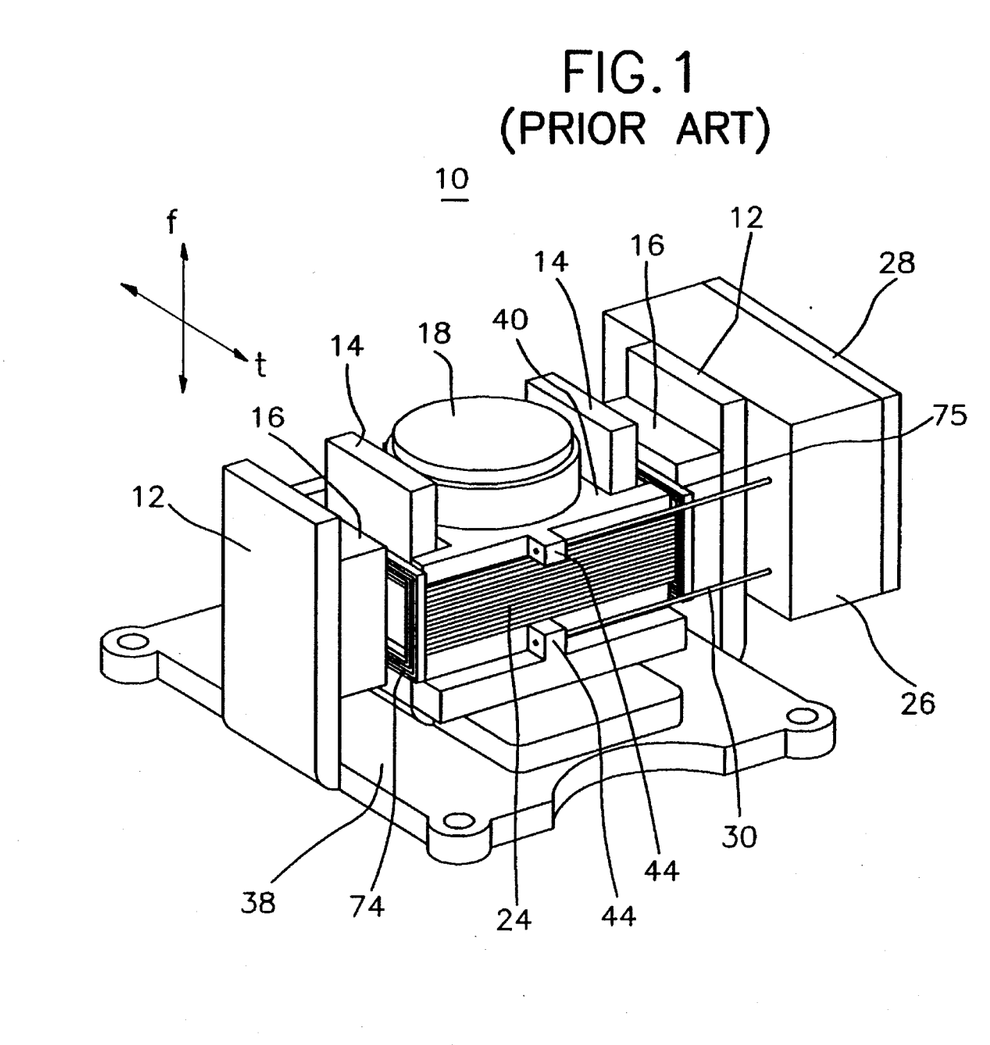
FIG. 1 is a perspective view for showing a structure of a conventional optical pickup actuator in an optical disc player.

FIG. 1 is a perspective view for showing a structure of an example of a conventional linear tracking type optical pickup actuator.

As shown in FIG. 1, a conventional optical pickup actuator 10 includes a base plate 38 having a laser beam through hole (not shown) at a central portion thereof through which a laser beam passes, a pair of facing outer yokes 12 and a pair of facing inner yokes 14 each formed at left and right sides on base plate 38 while centering the laser beam through hole. A damping-gel plate 26 is secured to an outer surface of one of outer yokes 12.

An objective lens holder 40 is disposed above the laser beam through hole and provided with an object lens 18. Objective lens holder 40 has a focusing coil 24 which is installed on front, rear, left and right outer surfaces for the focusing operation and first, second, third and fourth tracking coils 73, 74, 75 and 76 each pair of which is attached to left and right outer surfaces of focusing coil 24.

A pair of magnets 16 is respectively disposed between outer yokes 12 and inner yokes 14 for driving objective lens 18 in the focusing operation direction shown by an arrow f and the tracking operation direction shown by an arrow t by forming magnetic flux with outer yokes 12 and inner yokes 14 toward focusing coil 24 and first, second, third and fourth tracking coils 73, 74, 75 and 76.

Objective lens holder 40 has a plurality of projections 44 formed symmetrically on front and rear outer surfaces in which suspensions 30 are fixed. Both ends of suspensions 30 are respectively fixed to projections 44 and damping-gel plate 26 to eliminate undesired vibrations caused by vibrations of objective lens 18 in the optical-axis direction or in the radial direction and external shocks.

In the conventional optical pickup actuator in an optical disc player having the above structure, a pair of outer yokes 12 and a pair of inner yokes 14 are installed at left and right sides of base plate 38 in order to be elements constituting a closed magnetic circuit. In addition, the volumes of damping-gel plate 26 and printed-circuit board 28 are large. Thus, the overall height and length of the optical pickup actuator are increased, and the steps of assembly process become complicated with an increasing number of parts. As a result, workability and productivity decrease.

As an example of the aforementioned optical pickup actuator, U.S. Pat. No. 5,144,607 (granted to Tomoyuki Ishida et al.) discloses a structure of an optical pickup actuator adapted for the above-mentioned linear tracking operation. This optical pickup actuator includes an objective lens bobbin (or holder) provided with an objective lens, an objective lens supporting member for movably supporting the objective lens bobbin in the focusing and the tracking operation directions, focusing coils and tracking coils inserted within the objective lens bobbin, and a magnetic yoke for driving the objective lens in the focusing and tracking operation directions by forming magnetic flux toward focusing coils and tracking coils. In the above conventional optical pickup actuator, focusing coils and tracking coils are inserted in two coil housings of the objective lens bobbin. The objective lens supporting member includes first and second objective lens supporting members arranged at front and rear outer surfaces of the lens bobbin. Each of the first and the second objective lens supporting members has a pair of suspension plates and a pair of connecting plates interconnected to respective ends of a pair of suspension plates to each other, thereby forming a rectangular frame. A supporting member is inserted between one side of facing connecting plates of the first and the second objective lens supporting members. Further, the magnetic yoke includes a bottom plate, first and second side plates, a connecting plate, and first and second lugs, thereby forming a rectangular frame.

The above-mentioned optical pickup actuator of an optical pickup device includes the objective lens supporting member for supporting the objective lens in such a manner to eliminate undesired resonant vibrations during the operation of the optical pickup actuator. The optical pickup actuator also includes the magnetic yokes constituting the magnetic circuit section and having the structure for eliminating vibrations of the magnetic yokes without using a fastener for suppressing the vibrations.

However, since the optical pickup actuator requires assembled structures provided on both sides of the objective lens bobbin, the structure of the optical pickup device becomes complicated as described above, and the overall height and length of the optical pickup actuator increase.

The aforementioned optical pickup actuator 10 has the structure in which U-shaped inner yoke 14 is mounted on base plate 38. A conventional optical pickup actuator having a different structure from that of optical pickup actuator 10, has a pair of inner yokes formed by bending a pair of inner quadrilaterals upwards at right angles after cutting a base plate with a flat plate shape along outlines of the inner quadrilaterals except bending portions corresponding to parallel outer sides of the inner quadrilaterals with respect to an axis of symmetry drawn between the inner quadrilaterals which are included at a central portion of the base plate and disposed facing each other. Also, this optical pickup actuator has a pair of outer yokes formed by bending a pair of outer quadrilaterals upwards at right angles after cutting the base plate along outlines of the outer quadrilaterals except bending portions corresponding to parallel outer sides of outer quadrilaterals with respect to an axis of symmetry drawn between the outer quadrilaterals which are included in left and right portions of the base plate and aligned with the inner quadrilaterals. Since a pair of outer yokes and a pair of inner yokes are respectively disposed in left and right portions and at the central portion of the base plate, sizes of the inner yokes are restricted in a step for cutting outlines of the quadrilaterals. As a result, heights of the inner yokes are lower than those of the outer yokes. A pair of magnets is secured to the inner lateral sides of a pair of outer yokes, so that magnetic lines of forces are directed from the magnets to the inner yokes. Left and right portions of a focusing coil and first, second, third and fourth tracking coils are disposed between a pair of magnets and a pair of inner yokes.

Since the heights of the inner yokes are lower than those of the outer yokes, in case lengths of the magnets are longer than those of the inner yokes, the absolute values of magnetic flux densities become small, and intervals between the magnetic lines of forces are becoming narrower while approaching the inner yokes. Thus, distributions of the magnetic fluxes with respect to the focusing coil and the first, second, third and fourth tracking coils, are not uniform.

SUMMARY OF THE INVENTION

Therefore, it is an object of the present invention to provide an optical pickup actuator for an optical disk player having a small size, requiring fewer steps of assembly process and having enhanced performances of magnetic circuits.

In order to achieve the above object, the present invention provides an optical pickup actuator for an optical disk player, which comprises:

a base plate having a laser beam through hole at a central portion thereof through which a laser beam passes and having a plurality of bolt securing holes for securing the optical pickup actuator to a body of the optical pickup device, the bolt securing holes being formed in circumferential portions surrounding the laser beam through hole;

a pair of yokes each having a first vertical portion integrally formed with the base plate and projected upwards at each side end of the base plate while centering the laser beam through hole, a horizontal portion bent horizontally at a top end toward the laser beam through hole and a second vertical portion bent downwards at a lateral end of the horizontal portion, thereby forming a hexahedron-shaped first space portion in each of the yokes and a second space portion between the yokes;

an objective lens holder having an objective lens retained therein and being disposed in the second space portion between the yokes, the objective lens holder having a focusing coil installed around front, rear, left and right outer surfaces and for supplying control signals so that the objective lens holder moves upwards or downwards, the objective lens holder having first, second, third and fourth tracking coils each having a flat plate shape and being attached with a small gap between two of the first, second, third and fourth tracking coils on each of left and right outer surfaces of the focusing coil and for supplying control signals so that the objective lens holder moves frontwards or downwards, the objective lens holder having a plurality of suspension fixing projections formed symmetrically at the central portions of front and rear outer surfaces to which a first end of each of suspensions is respectively fixed;

a pair of magnets each inserted within the first space portion and disposed facing the focusing coil and the first, second, third and fourth tracking coils;

a plurality of suspensions each having a straight wire shape with a first end being fixed to each of the suspension fixing projections, for elastically supporting and moving the objective lens holder upwards, downwards, frontwards and rearwards;

a pair of damping-gel plates each having a horizontal portion integrally formed with the base plate and projected laterally at one side end of the base plate while centering one of the yokes, a vertical portion bent upwards on an end of the horizontal portion and a plurality of suspension supporting holes in which a second end of each of the suspensions is respectively fixed; and a printed-circuit board secured to outer surfaces of the vertical portions of the damping-gel plates, the printed-circuit board having a plurality of holes in which the second end of each of the suspensions is respectively fixed.

Preferably, the suspension fixing holes are filled with a gel type damping material (such as silicone gel) to prevent external shocks from being directly applied to the objective lens holder. In the yokes, the second vertical portions are preferably bent downwards in accordance with the sizes of magnets, and the widths of the second vertical portions are preferably narrower than those of the first vertical portions and slant portions are formed so as to have trapezoid shapes at half portions of the horizontal portions which are connected with the second vertical portions. The objective lens holder has a pair of yoke inserting grooves formed at left and right outer surfaces in which the second vertical portions of the yokes are inserted. The first, second, third and fourth tracking coils are disposed between the magnets and inner lateral sides of the second vertical portions.

In an optical pickup actuator in an optical disc player according to the present invention, a pair of yokes and a pair of damping-gel plates are integrally formed with the base plate, and the printed circuit board has a small size and a light weight. Consequently, the simple structure of the optical pickup actuator causes an overall size and steps of assembly process to be decreased. In addition, the performances of the magnetic circuits are enhanced such that the second vertical portions of the yokes can be bent in accordance with the sizes of the magnets.

BRIEF DESCRIPTION OF THE DRAWINGS

The above object and other advantages of the present invention will become more apparent by describing in detail the preferred embodiment of the present invention with reference to the attached drawings, in which.

DESCRIPTION OF THE PREFERRED EMBODIMENT

A description will be given below in detail to the structure and operations of an optical pickup actuator in an optical disc player according to an embodiment of the present invention with reference to the accompanying drawings.

Figure 2:
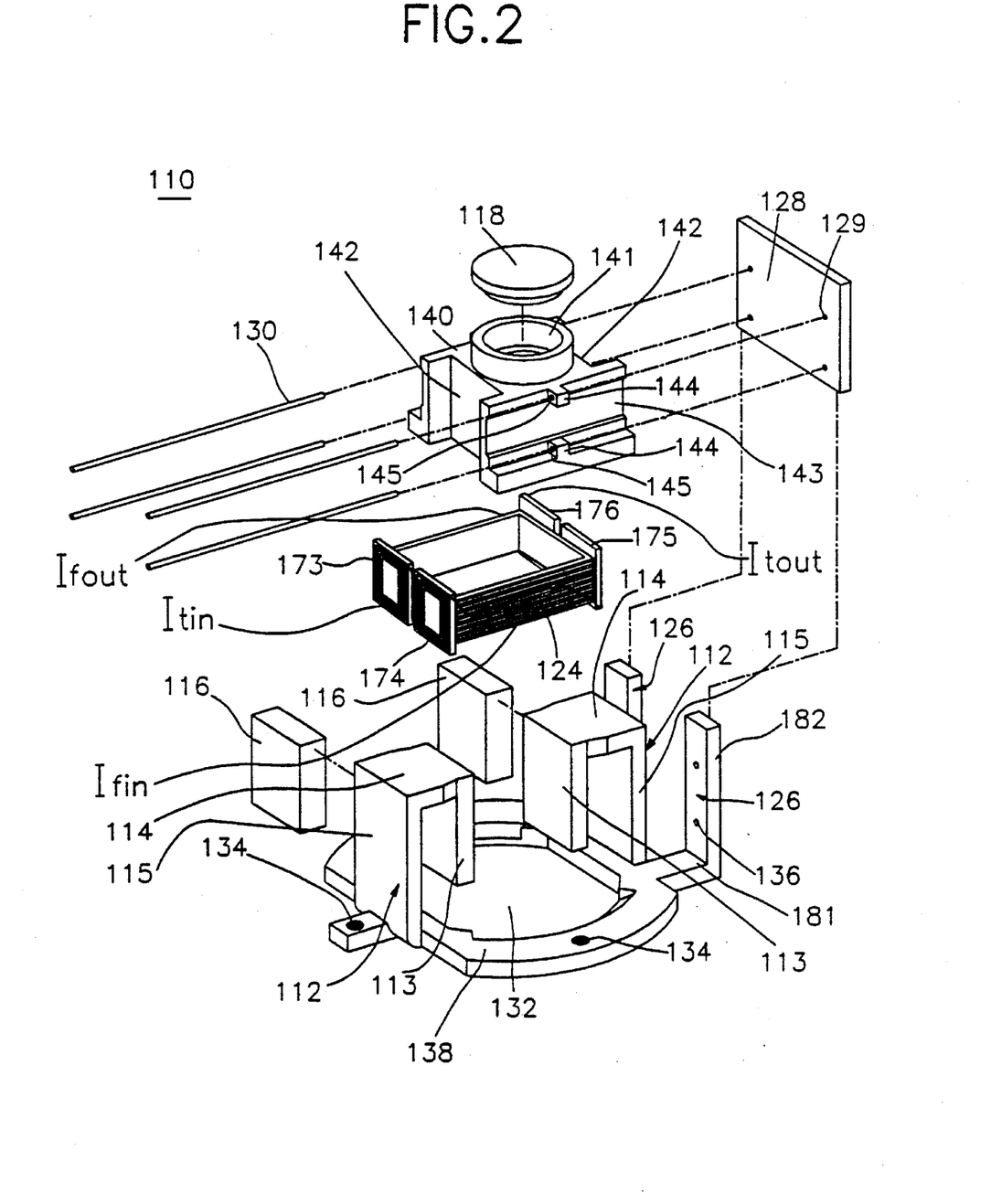
FIG. 2 is an exploded perspective view for showing a structure of an optical pickup actuator according to an embodiment of the present invention.
Figure 3:
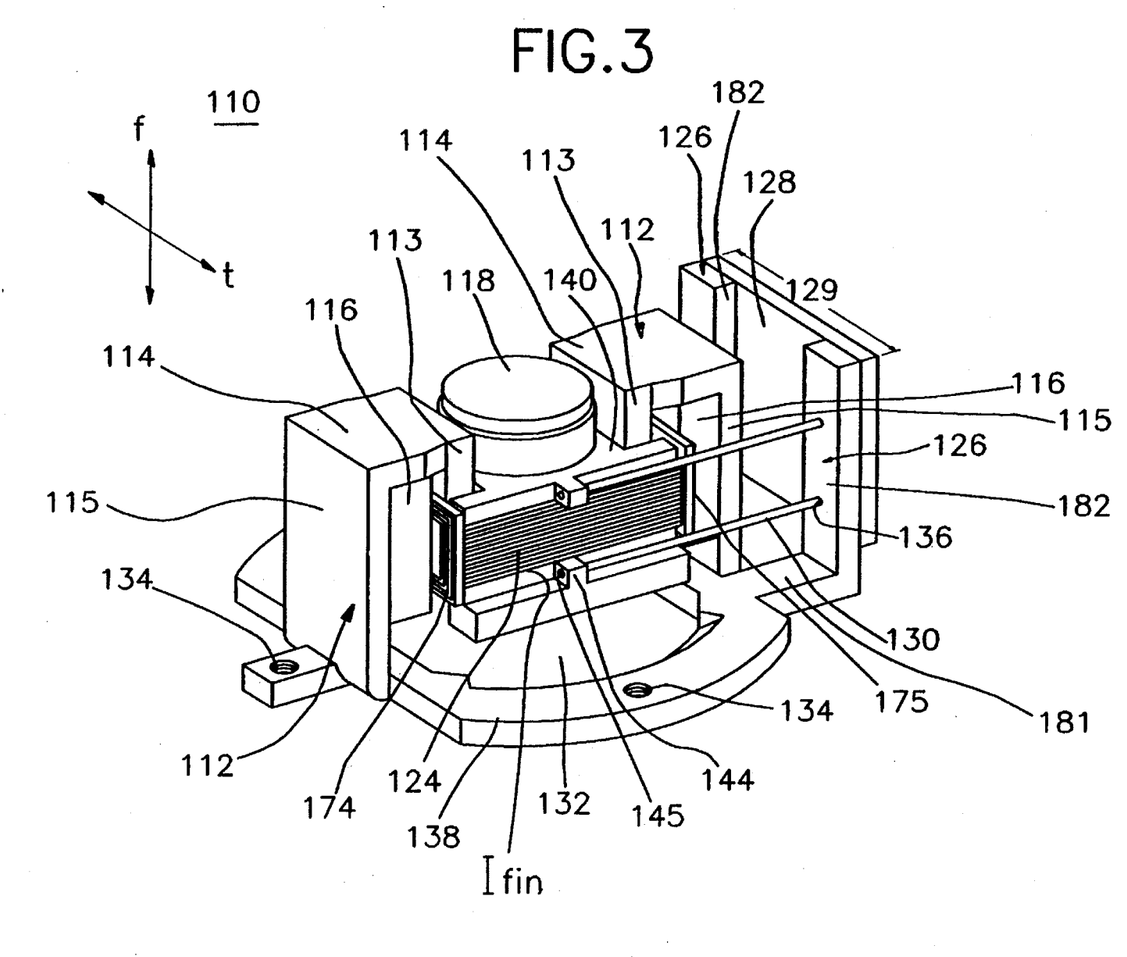
FIG. 3 is an assembled perspective view for showing a structure of the optical pickup actuator as shown in FIG. 2.
Figure 4:
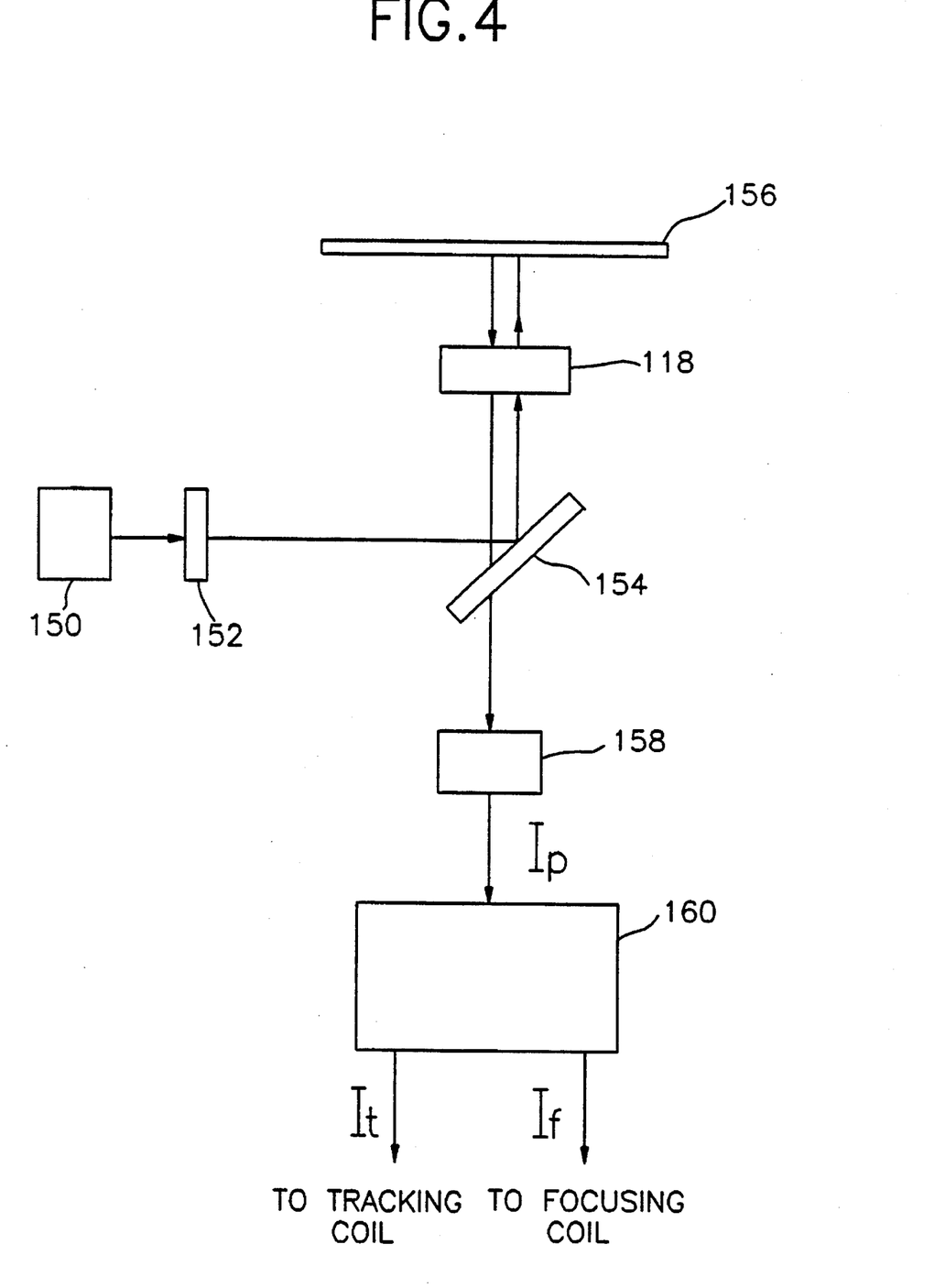
FIG. 4 is a simplified block diagram of a servo system for supplying control currents for tracking and focusing operations of the optical pickup actuator in an optical disc player as shown in FIG. 3.

FIG. 2 is an exploded perspective view for showing a structure of an optical pickup actuator according to an embodiment of the present invention, and FIG. 3 is an assembled perspective view for showing a structure of the optical pickup actuator as shown in FIG. 2. As shown in FIGS. 2 and 3, the optical pickup actuator 110 in an optical disc player according to an embodiment of the present invention includes a base plate 138 having a laser beam through hole 132 at a central portion thereof through which a laser beam generated from a laser diode (as shown in FIG. 4) installed below base plate 138 passes. A plurality of bolt securing holes 134 is formed in circumferential portions surrounding laser beam through hole 132 of base plate 138 for securing optical pickup actuator 110 to a body (not shown) of an optical pickup device.

A pair of yokes 112 is integrally formed with base plate 138 at both sides of ends thereof and a pair of magnets 116 is attached to the inner lateral sides of the upstanding segments of yokes 112. Each of yokes 112 has a first vertical portion 115 integrally formed with base plate 138 and projected upwards with a predetermined height at each side end of base plate 138 while centering laser beam through hole 132, a horizontal portion 114 bent horizontally at a right angle with a predetermined length at a top end of first vertical portion 115 toward laser beam through hole 132 and a second vertical portion 113 bent downwards toward laser beam through hole 132 at a right angle at a side end of horizontal portion 114 with a smaller length than the length of first vertical portion 115. Widths of second vertical portions 113 are narrower than those of first vertical portions 115 and slant portions are formed so as to have trapezoid shapes at half portions of horizontal portions 114 which are connected with second vertical portions 113. Each of yokes 112 has a hexahedron-shaped first space portion in each of yokes 112 and a second space portion between yokes 112 which is disposed over laser beam through hole 132. Second vertical portions 113 can be bent downwards in accordance with the sizes of magnets 116.

An objective lens holder 140 is disposed in the second space portion between yokes 112 and supports an objective lens 118 in an objective lens retaining portion 141 formed with a cylinder shape at an upper central portion thereof. Objective lens holder 140 has a pair of yoke inserting grooves 142 formed at left and right outer surfaces in which second vertical portions 113 of yokes 112 are inserted, and focusing coil fixing grooves 143 formed on front and rear outer surfaces to which focusing coil 124 is fixed to be installed around front, rear, left and right outer surfaces of objective lens holder 140. First, second, third and fourth tracking coils 173, 174, 175 and 176 each having rectangular flat plate shape are attached with a small gap between two of first, second, third and fourth tracking coils 173, 174, 175 and 176 on each of left and right outer surfaces of focusing coil 124 and are disposed between magnets 116 attached to the inner lateral sides of first vertical portions 115 of yokes 112 and inner lateral sides of second vertical portions 113. Magnetic circuits have magnets 116 and yokes 112, and apply magnetic fields to focusing coil 124 and first, second, third and fourth tracking coils 173, 174, 175 and 176.

The optical pickup actuator further includes a plurality of suspensions 130 each having a straight wire shape for elastically supporting and for moving objective lens holder 140 upwards, downwards, frontwards and rearwards. The number of suspensions 130 is desirably an even number not less than 4.

A pair of damping-gel plates 126 integrally formed with base plate 138, is projected at a lateral end of base plate 138 while centering one of yokes 112. Each of damping-gel plates 126 has a horizontal portion 181 integrally formed with base plate 138 and projected laterally at one side end of base plate 138, and a vertical portion 182 bent upwards at a right angle on an end of horizontal portion 181 with the same heights as the heights of yokes 112. Vertical portion 182 has a plurality of suspension supporting holes 136 in which a second end of each of suspensions 130 is respectively fixed. Suspension fixing holes 136 are filled with a gel type damping material (such as silicone gel) to prevent external shocks from being directly applied to objective lens holder 140.

A printed-circuit board 128 is secured to outer surfaces of vertical portions 182 of a pair of damping-gel plates 126, and includes a plurality of holes 129 formed in front and rear symmetry in which a second end of each of suspensions 130 is respectively fixed. Printed-circuit board 128 is desirably formed with the same width 129 as a distance between front and rear outer surfaces of damping-gel plates 126, and with the same height as those of damping-gel plates 126 in order to be easily secured to damping-gel plate.

Objective lens has a plurality of suspension fixing projections 144 formed symmetrically at up and down central portions of front and rear outer surfaces to which a first end of each of suspensions 130 is respectively fixed. Thus, suspensions 130 are fixed to suspension fixing projections 144, damping-gel plates 126 and printed-circuit board 128 and elastically support and move objective lens holder 140 in the direction shown by an arrow t (frontward and rearward directions) during the tracking operation or in the direction shown by an arrow f (upward and downward directions) during the focusing operation.

FIG. 4 is a simplified block diagram of a servo system for supplying control currents for tracking and focusing operations of an optical pickup actuator in an optical disc player as shown in FIG. 3. As shown in FIG. 4, a laser beam which is emitted from a laser diode 150 travels through a grating lens 152 and reaches a half mirror 154.

The laser beam which has reached half mirror 154 passes through laser beam through hole 132 of base plate 138 and objective lens 118 of objective lens holder 140 to be irradiated on an optical disc 156. The laser beam which is irradiated on optical disc 156 is reflected to half mirror 154 through objective lens 118 and laser beam through hole 132.

A part of the reflected laser beam passes through half mirror 154 to be detected by a photo diode 158. Photo diode 158 generates an electrical signal $I_p$ in accordance with the incident laser beam. The generated electrical signal $I_p$ is inputted into an optical pickup actuator servo system 160, which outputs tracking and focusing control currents $I_t$ and $I_f$ to first, second, third and fourth tracking coils 173, 174, 175 and 176 and to focusing coil 124 so as to correct tracking and focusing errors, respectively. As shown in FIGS. 2 and 4, tracking and focusing currents $I_t$ and $I_f$ are respectively inputted into an input terminal $I_{tin}$ of tracking coils 173, 174, 175 and 176 and into an input terminal $I_{fin}$ of focusing coil 124 and outputted through output terminals $I_{tout}$ and $I_{fout}$.

Figure 5:
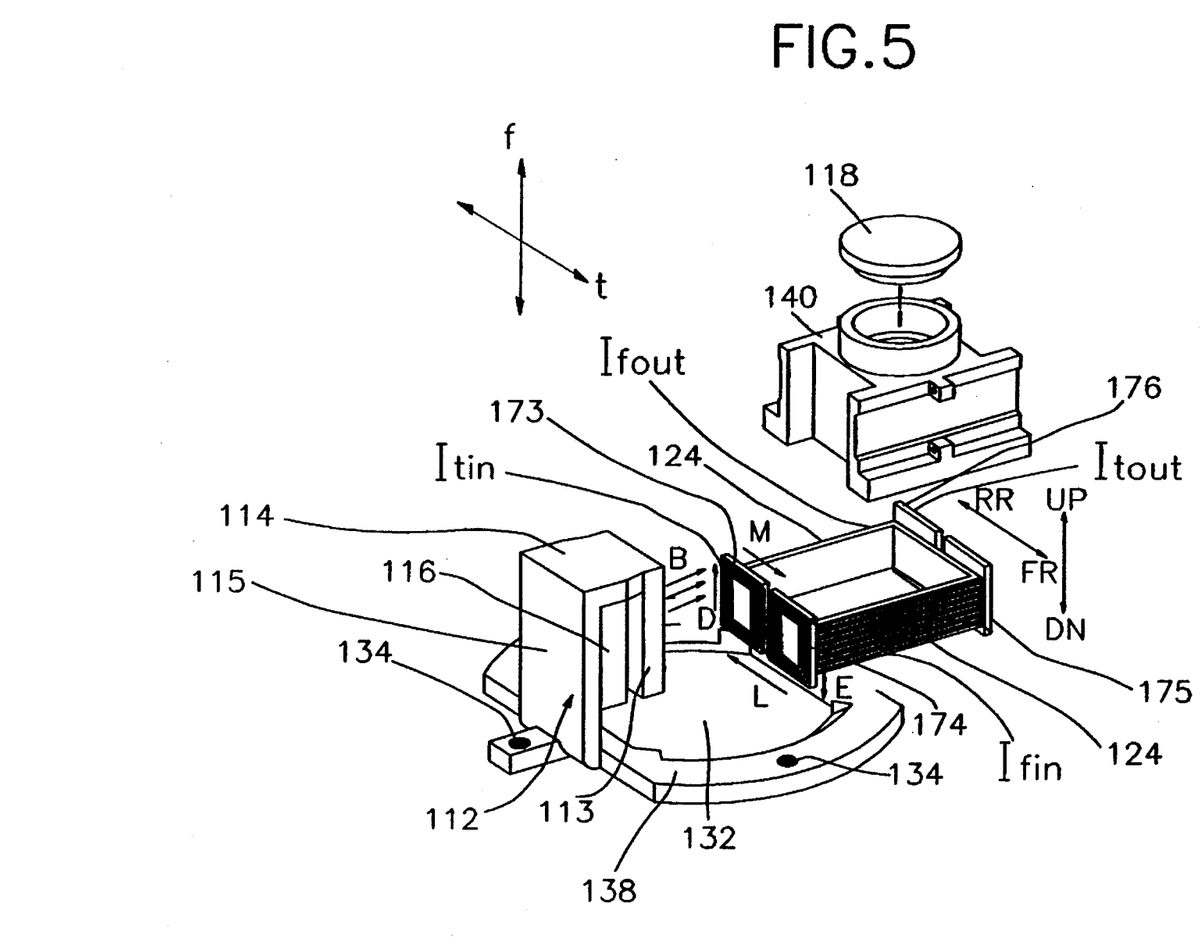
FIG. 5 is a diagrammatic view for explaining force directions formed due to a magnetic field and current flowing through tracking and focusing coils of the optical pickup actuator in an optical disc player as shown in FIGS. 2 and 3.

FIG. 5 is a diagrammatic view for explaining force directions formed due to a magnetic field and currents flowing through tracking and focusing coils of the optical pickup actuator in an optical disc player as shown in FIGS. 2 and 3. As shown in FIG. 5, since the N pole of each of magnets 116 is always facing toward tracking coils 173, 174, 175 and 176 and focusing coil 124, a direction of the magnetic field B is directed toward focusing coil 124 and tracking coils 173, 174, 175 and 176. When a current flows through focusing coil 124 in the direction of an arrow L, the force is generated downwards according to Fleming's left hand law (F=I×B). Accordingly, objective lens holder 140 moves downwards, i.e., in the direction of an arrow DN. The force is generated between an opposite focusing coil 124 and the flux B in the same direction, so that objective lens holder 140 moves downwards.

On the other hand, when a current flows in focusing coil 124 in the direction of an arrow M, the force is generated in the upward direction according to the same law (F=I×B). Accordingly, objective lens holder 140 moves upwards, i.e., in the direction of an arrow UP.

In case a current flows through first tracking coil 173 counterclockwise and second tracking coil 174 clockwise, since the current directions of horizontal portions in first and second tracking coils 173 and 174 are in direct opposition to each other, the directions of the generated forces are in direct opposition to each other. Consequently the forces offset each other. Since the current directions of inner vertical portions in first and second tracking coils 173 and 174 coincide with each other with respect to the direction of an arrow D, the force is generated in the rearward direction according to Fleming's left hand law, so that objective lens holder 140 is pushed rearwards. Then, if a current flows through third tracking coil 175 clockwise and fourth tracking coil 176 counterclockwise, since the forces which are generated at horizontal portions in third and fourth tracking coils 175 and 176 offset each other and the current directions of inner vertical portions in third and fourth tracking coils 175 and 176 coincide with each other with respect to the direction of an arrow E, the force is generated in the rearward direction. Accordingly, objective lens holder 140 is pushed rearwards, i.e., in the direction of an arrow RR.

On the other hand, when a current flows through first tracking coil 173 clockwise and second tracking coil 174 counterclockwise, and then if a current flows through third tracking coil 175 counterclockwise and fourth tracking coil 176 clockwise, the force is generated in the frontward direction, so that objective lens holder 140 is pushed frontwards, i.e., in the direction of an arrow FR.

As outer vertical portions in first, second, third and fourth tracking coils 173, 174, 175 and 176 are disposed out of exerting ranges of magnetic fields in the magnetic circuits, the outer vertical portions in first, second, third and fourth tracking coils 173, 174, 175 and 176 have little relation to frontward and rearward movements of objective lens holder 140.

Consequently, in an optical pickup actuator according to the present invention, base plate 138 is integrally formed with a pair of yokes 112 and a pair of damping-gel plates 126 so that a simple structure of the optical pickup actuator may be attained. Accordingly, since the overall size can be reduced, a thin structure of an optical pickup device can be attained. Further, since the steps of assembly process are reduced, the workability and productivity are improved. In addition, since second vertical portions 113 of yokes 112 can be bent downwards in accordance with the sizes of magnets 116, the absolute values of magnetic flux densities B's can be enhanced, and the distributions of magnetic fluxes with respect to focusing coil 124 and first, second, third and fourth tracking coils 173, 174, 175 and 176 can be made uniform. In the above, the present invention is described based on the preferred embodiment of the present invention, but it should be apparent to those ordinarily skilled in the art that various modifications and changes can be added without departing from the scope of the present invention which is limited only by the appended claims.

What is claimed is:

1. An optical pickup actuator in an optical pickup device, said optical pickup actuator comprising:

a base plate having a laser beam through hole at a central portion thereof through which a laser beam passes and having a plurality of bolt securing holes for securing said optical pickup actuator to a body of said optical pickup device, said bolt securing holes being formed in circumferential portions surrounding the laser beam through hole;

a pair of yokes each having a first vertical portion integrally formed with said base plate and projected upwards at each side end of said base plate while centering said laser beam through hole, a horizontal portion bent horizontally at a top end toward said laser beam through hole and a second vertical portion bent downwards at a lateral end of said horizontal portion, thereby forming a hexahedron-shaped first space portion in each of said yokes and a second space portion between said yokes;

an objective lens holder having an objective lens retained therein and being disposed in said second space portion between said yokes, said objective lens holder having a focusing coil installed around front, rear, left and right outer surfaces and for supplying control signals so that said objective lens holder moves upwards or downwards, said objective lens holder having first, second, third and fourth tracking coils each having a flat plate shape and being attached with a small gap between two of said first, second, third and fourth tracking coils on each of left and right outer surfaces of said focusing coil and for supplying control signals so that said objective lens holder moves frontwards or downwards, said objective lens holder having a plurality of suspension fixing projections formed symmetrically at the central portions of front and rear outer surfaces to which a first end of each of suspensions is respectively fixed;

a pair of magnets each inserted within said first space portion and disposed facing said focusing coil and said first, second, third and fourth tracking coils;

a plurality of suspensions each having a straight wire shape with a first end being fixed to each of the suspension fixing projections, for elastically supporting and moving said objective lens holder upwards, downwards, frontwards and rearwards;

a pair of damping-gel plates each having a horizontal portion integrally formed with said base plate and projected laterally at one side end of said base plate while centering one of said yokes, a vertical portion bent upwards on an end of said horizontal portion and a plurality of suspension supporting holes in which a second end of each of said suspensions is respectively fixed; and a printed-circuit board secured to outer surfaces of said vertical portions of said damping-gel plates, said printed-circuit board having a plurality of holes in which said second end of each of said suspensions is respectively fixed.

2. The optical pickup actuator as claimed in claim 1, wherein said suspension fixing holes are filled with a gel type damping material to prevent external shocks from being directly applied to said objective lens holder.

3. The optical pickup actuator as claimed in claim 1, wherein said second vertical portions of yokes are bent downwards in accordance with sizes of said magnets, widths of said second vertical portions of yokes are narrower than those of said first vertical portions and slant portions are formed so as to have trapezoid shapes at half portions of said horizontal portions which are connected with said second vertical portions.

4. The optical pickup actuator as claimed in claim 1, wherein said objective lens holder has a pair of yoke inserting grooves formed at left and right outer surfaces in which said second vertical portions of said yokes are inserted.

5. The optical pickup actuator as claimed in claim 1, wherein said first, second, third and fourth tracking coils are disposed between said magnets and inner lateral sides of said second vertical portions.

* * * * *